United States Patent [19]

Fillion

[11] 3,968,811

[45] July 13, 1976

[54] PRESSURIZED FLUID CONTROL CIRCUIT

[75] Inventor: Pierre C. Fillion, Nanteuil-le-Haudouin, France

[73] Assignee: Societe Anonyme: Poclain, Le-Plessis-Belleville, France

[22] Filed: May 9, 1975

[21] Appl. No.: 576,049

[30] Foreign Application Priority Data

May 16, 1974 France .............................. 74.17084

[52] U.S. Cl. .................................. 137/114; 60/421; 60/430

[51] Int. Cl.[2] .......................................... G05D 16/04

[58] Field of Search ............. 137/114, 118; 60/421, 60/430

[56] References Cited

UNITED STATES PATENTS 1,982,711 12/1934 Vickers ................................. 60/430

3,587,237 6/1971 Pierrat ................................. 60/430

*Primary Examiner*—Robert G. Nilson

*Attorney, Agent, or Firm*—Mason, Fenwick & Lawrence

[57] ABSTRACT

The present invention is directed to a supply circuit for a hydraulic jack employing two pumps in which a valve is positioned in a pipe which is branched to the delivery pipe of the first pump and is controlled by two jacks supplied by the fluid delivered by the second pump. A constrictor is positioned in the supply system for one of the jacks and another constrictor is placed in the discharge system for the two jacks with the invention being particularly applicable to achieving a stable control circuit for the load relief of the first pump.

4 Claims, 3 Drawing Figures

PRESSURIZED FLUID CONTROL CIRCUIT

Figure 1:
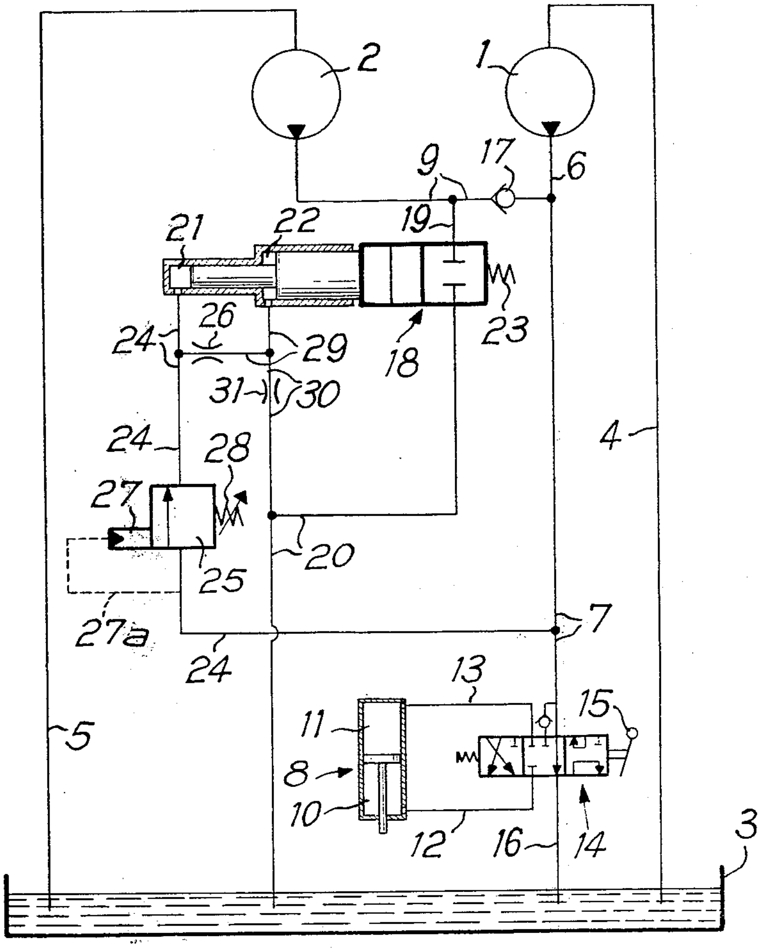

It is known that a large number of machines and more particularly public works vehicles are operated by means of driving members, jacks or rotary hydraulic motors.

The various receiving means are often supplied by several pumps, some of which must discharge into a discharge tank without pressure when the supply pressure of a receiving means exceeds a predetermined threshold. This is done so as not to excessively overload the driving motor for the pumps.

It is therefore necessary to provide in the delivery pipe of at least one pump a valve which links the delivery pipe of the said pump either with the supply system of a receiving means or with the tank.

This is a sequence valve whose hitherto known control devices have lacked stability.

The present invention aims at eliminating this deficiency and to this end has for its object a pressurised fluid control circuit comprising at least one receiving means, a pipe for supplying the receiving means called the main supply pipe, a first pressurised fluid source which is provided with a delivery pipe called the first pipe and connected to the main supply pipe, a second pressurised fluid source provided with a delivery pipe called the second pipe connected to a receiving means, a branch pipe connected on the one hand to the second pipe and on the other to a two-position valve, a first discharge pipe connected to the valve, a first-position regulating member which is coupled to the valve and has a working chamber called the first working chamber which can be connected with a pressurised fluid whose action is opposite to that of the restoring member which is also coupled to the valve, whereby the action of the said restoring member when it predominates is to bring the valve into its first position where the branch pipe is shut off whilst the second position of the valve corresponds to the connection of the branch pipe to the first discharge pipe, a supply pipe for the first working chamber called the first supply pipe connecting the main supply pipe to the first working chamber, whilst on the said first supply pipe is positioned a calibrated relief valve equipped with a member for controlling its opening connected to the first supply pipe between the main supply pipe and the calibrated relief valve, a second discharge pipe connected to the first working chamber and a first constrictor placed between the said second discharge pipe and the first working chamber.

This circuit also comprises a second postion regulating member which is coupled to the valve and comprises a working chamber called the second working chamber which can be made to connect with a pressurised fluid whose effect is also opposite to that of the restoring member, whereby the said second discharge pipe is also connected to the said second working chamber, a supply pipe for the second working chamber called the second supply pipe which links the first working chamber to the second working chamber and wherein is provided the first constrictor and a second constrictor placed in the second discharge pipe.

It is sometimes advantageous for one or other of the first and second working chambers to be connected by a connecting pipe to a pressurised fluid source, whilst a further two-position valve is located in this connecting pipe shutting it off in its first position and ensuring the continuity thereof in its second position, whereby the said other valve is equipped with a spontaneous position control system.

According to an embodiment, a third pressurised fluid source is provided whose delivery pipe is connected to a receiving means whilst another member for controlling the opening of the relief valve is coupled to the said valve and connected to the delivery pipe of the third source.

In preferred manner, the receiving means to which is connected the second pipe comprises the receiving means to which is connected the main supply pipe, whilst a non-return valve is positioned in the second pipe so as to permit the passage of the fluid from the second source to the receiving means and thereby the branch pipe is connected to the second pipe between the second source and the non-return valve.

The invention will be better understood and its secondary characteristics and advantages more easily gathered from the following description of exemplified non-limitative embodiments described hereinafter with reference to the drawings.

Figure 2:
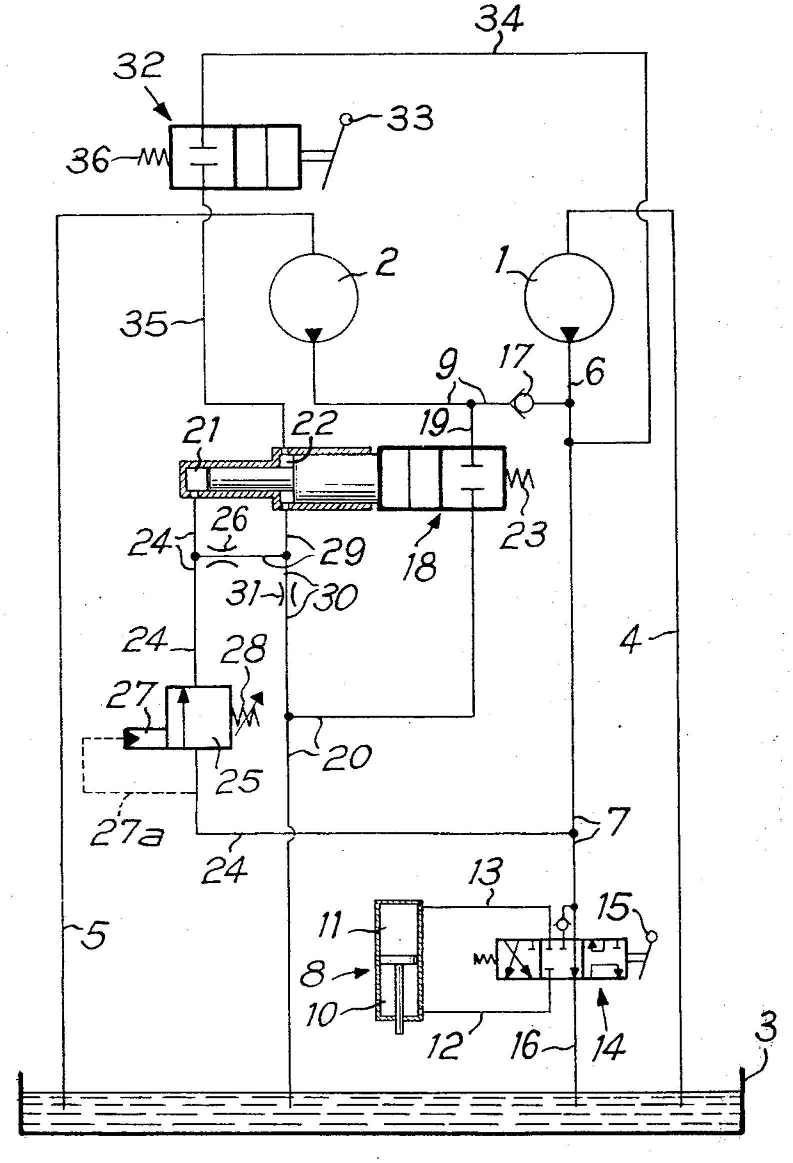
Figure 3:
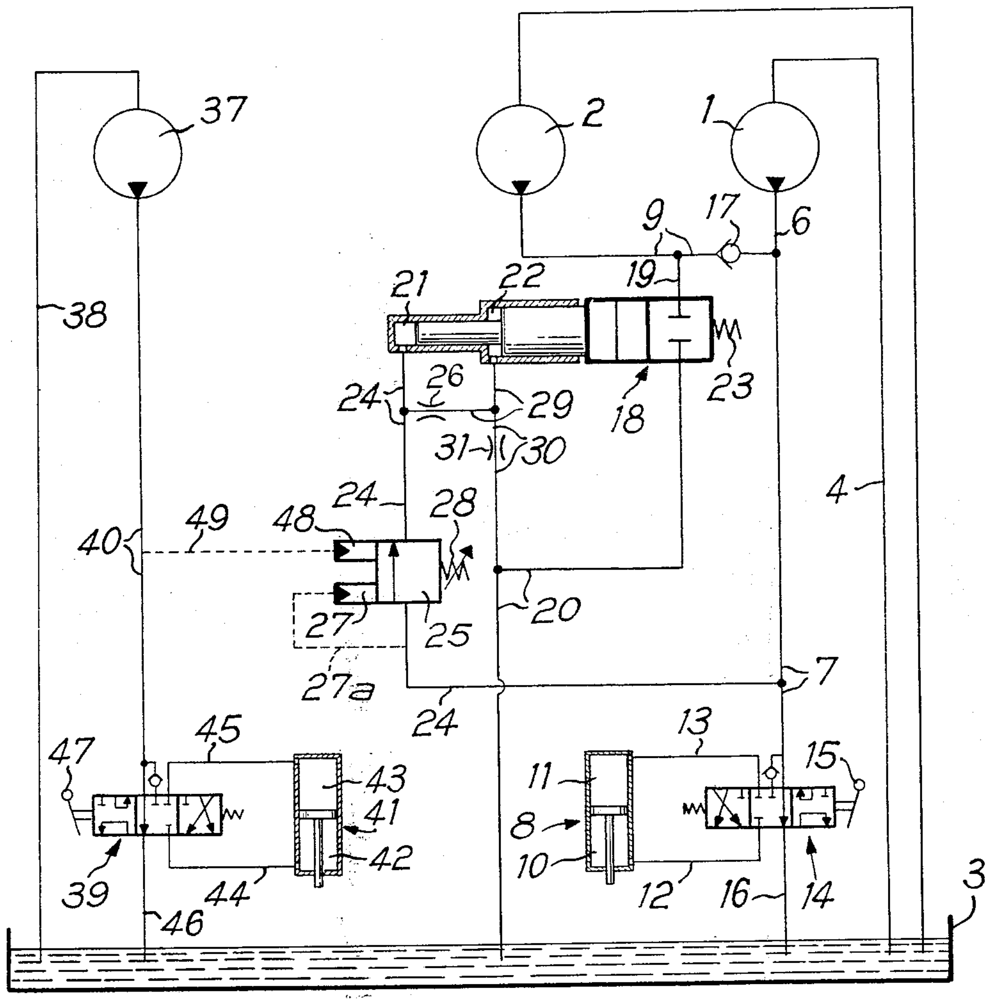

In the drawings FIGS. 1 to 3 are the diagrams of the three circuits according to the invention.

The circuit of FIG. 1 has a first pump 1 and a second pump 2 which are connected to a fluid tank 3 via their respective suction pipes 4 and 5.

The delivery pipe 6 of pump 1 is connected to the supply pipe 7 of a jack 8, whereby the delivery pipe 9 of pump 2 is itself connected to pipe 6.

Jack 8 is a double-acting jack having two chambers 10 and 11 which are connected by pipes 12 and 13 respectively to a three-position valve 14 having a manual control system 15. This valve 14 is also connected to tank 3 by a pipe 16 whilst pipe 7 is also connected thereto.

Its first position corresponds to the connection of pipes 13 and 16 and pipes 7 and 12.

Its second position corresponds to the connection of pipes 7 and 16 and the shutting off of pipes 12 and 13.

Its third position corresponds to the connection of pipes 7 and 13 and pipes 12 and 16.

A non-return valve 17 is positioned in pipe 9 and permits the passage of fluid solely from pump 2 to pipe 6.

A two-position distributor valve 18 is connected on the one hand to that portion of pipe 9 between pump 2 and valve 17 by a pipe 19 and on the other to a tank 3 via a discharge pipe 20. It is also coupled on the one hand to a double-acting jack having two working chambers 21 and 22 and on the other to an elastic restoring member 23 in the form of a spring whose action is opposite to that of the fluids contained in chambers 21 and 22.

The first position of distributor valve 18 corresponds to the predominance of the action of the restoring member 23 wherein pipes 19 and 20 are shut off.

The second position of distributor valve 18 is that in which there is a connection between pipes 19 and 20.

Chamber 21 is connected to pipes 7 by a pipe 24 whereon is provided a calibrated relief valve 25. To relief valve 25 is coupled a jack 27 for controlling the opening thereof supplied in per se known manner by a pipe 27a with fluid contained in that portion of pipe 24 between pipe 7 and relief valve 25. A spring 28 keeps valve 25 closed.

Chamber 22 is connected by a pipe 29 to pipe 24 whilst a first constrictor 26 is positioned in pipe 29 and a pipe 30 connects pipe 29 to discharge pipe 20, a second constrictor 31 being positioned in pipe 30.

The circuit of FIG. 2 shows the same components as that of FIG. 1 supplemented by a further two-position valve 32 having a manual control system 33. Pipes 34 and 35 connect this valve 32 respectively to pipe 7 and to chamber 22.

The first position of distributor valve 32 corresponds to the shutting off of pipes 34 and 35.

The second position of distributor valve 32 corresponds to the connection of pipes 34 and 35.

It should be noted that when there is no action on the control system 33, distributor valve 32 is maintained in its first position under the action of a spring 36 coupled thereto.

Finally relative to the circuit of FIG. 1, the circuit of FIG. 3 also has a third pump 37 which is connected to tank 3 by its suction pipe 38 and to a second three-position distributor valve 39 by its delivery pipe 40. A second double-acting jack 41 has two working chambers 42 and 43, whereby the latter chambers are connected to valve 39 respectively by pipes 44 and 45. This distributor valve 39 is also connected to tank 3 by a pipe 46 and has a manual control system 47.

The first position of distributor valve 39 corresponds to the connection of pipes 40 and 44 and pipes 45 and 46.

The second position corresponds to the connection of pipes 40 and 46 and the shutting off of pipes 44 and 45.

The third position corresponds to the connection of pipes 44 and 46 and pipes 40 and 45.

It should be noted that a second jack 48 for controlling its opening is coupled to the calibrated relief valve 25 and is connected by a pipe 49 to pipe 40.

The operation of the circuits shown in the drawings will now be described.

With reference to the circuit of FIG. 1, firstly valve 14 is placed in one of its first and third positions, for example in its first position.

There are two operating phases whereby the first corresponds to a resistant load on jack 8 which is below a predetermined value whilst the second phase corresponds to a resistant load which exceeds the said predetermined value.

During the first operating phase the pressure in pipe 7 is itself below a given value called the pressure threshold, above which the relief valve 25 opens but below which the said valve remains closed. Consequently the fluid contained in pipe 7 does not reach working chambers 21 and 22, whilst the fluid already contained in the said chambers returns to tank 3 via pipes 29 and 30 and 20 traversing constrictors 26 and 31. Under the action of spring 23 the distributor valve 18 is positioned and maintained in its first position. as pipe 19 is shut off the two pumps 1 and 2 both discharge into pipe 7 so that jack 8 is supplied with a large flow of a fluid under moderate pressure equal to the sum of the two flows of the two pumps.

When the resistant load applied to jack 8 increases and exceeds the predetermined value the pressure in pipe 7 increases and itself exceeds the above-indicated threshold. Valve 25 is open and the pressurised fluid from pipe 7 passes into chambers 21 and 22, a pressure which in the case of chamber 22 is below that in pipe 7, whereby the pressure difference takes account of the load loss caused by constrictor 26. The pressure of chambers 21 and 22 is still sufficient to have an action greater than that of spring 23 and sufficient to place distributor valve 18 in its second position. The fluid delivered by pump 1 maintains non-return valve 17 closed whilst that delivered by pump 2 returns to tank 3 via that portion of pipe 9 connected to pipe 19 and by pipes 19 and 20.

Jack 8 is now only supplied by pump 1 but at a high pressure. The sequence performed is interesting in itself and is more particularly advantageous in the case where pumps 1 and 2 are driven by a single motor, for example of the diesel type whose maximum power is less than the sum of the maximum powers of the pumps. In fact it is only the load relief resulting from the connection of the delivery of pump 2 with tank 3 which permits the operation of the apparatus.

It is important to note the presence of constrictors 26 and 31. The effect of constrictor 26 is to produce variations in the presence of thfluid from pipe 7 and to supply chamber 22 with a fluid at substantially constant pressure or only having slight instantaneous variations. The effect of constrictor 31 is complementary to that of constrictor 26 and prevents a too rapid drop of pressure in chambers 21 and 22 and a too sudden restoring action of spring 23. In this way a satisfactory stability of the position regulation of valve 18 is obtained providing good operating conditions for pump 2.

In certain circumstances it may be advantageous to connect the delivery pipe of pump 2 with tank 3. To do this the construction of FIG. 2 is adopted wherein the placing of valve 32 in its second position permits the pressurised fluid from pipe 7 to pass into chamber 22, via pipes 34 and 35, thus placing distributor valve 18 in its second position.

It is also advantageous in certain cases to control the opening of relief valve 25 not only via the pressure of the fluid from pipe 7 but also via the delivery pressure of a pump 37, (FIG. 3). The control of a second jack 48 by the pressure of the fluid from delivery pipe 40 of pump 37 solves this problem. It should be noted that the double-controlled relief valve of FIG. 3 is known per se.

The invention is not limited to the embodiments described hereinbefore, but on the contrary covers all variants which can be made thereto without passing beyond the scope of the present invention.

What is claimed is:

1. A pressurised fluid control circuit comprising at least one receiving means, a pipe for supplying the receiving means called the main supply pipe, a first pressurised fluid source which is provided with a delivery pipe called the first pipe and connected to the main supply pipe, a second pressurised fluid source provided with a delivery pipe called the second pipe connected to a receiving means, a branch pipe connected on the one hand to the second pipe and on the other to a two-position valve, a first discharge pipe connected to the valve, a first-position regulating member which is coupled to the valve and has a working chamber called the first working chamber which can be connected with a pressurised fluid whose action is opposite to that of a restoring member which is also coupled to the valve, whereby the action of the said restoring member when it predominates is to bring the valve into its first position where the branch pipe is shut off whilst the second position of the valve corresponds to the connection of the branch pipe to the first discharge pipe, a supply pipe for the first working chamber called the first supply pipe connecting the main supply pipe to the first working chamber, whilst on the said first supply pipe is positioned a calibrated relief valve equipped with a member for controlling its opening connected to the first supply pipe between the main supply pipe and the calibrated relief valve, a second discharge pipe connected to the first working chamber and a first constrictor placed between the said second discharge pipe and the first working chamber, wherein this circuit comprises a second position regulating member which is coupled to the valve and comprises a working chamber called the second working chamber which can be made to connect with a pressurised fluid whose effect is also opposite to that of the restoring member, whereby the said second discharge pipe is also connected to the second second working chamber, a supply pipe for the said working chamber called the second supply pipe which links the first working chamber to the second working chamber and wherein is provided the first constrictor and a second constrictor placed in the second discharge pipe.

2. A circuit according to claim 1, wherein one or other of the first and second working chambers is connected by a connecting pipe to a pressurised fluid source whilst another two-position valve is located in the said connecting pipe which it shuts off in its first position and ensures the continuity thereof in its second position, whereby this second valve is equipped with a selectively actuable position control means.

3. A circuit according to claim 1, wherein it comprises a third pressurised fluid source having a delivery pipe connected to a receiving means whilst a further member for controlling the opening of the relief valve is coupled to the said valve and connected to the delivery pipe of the said third source.

4. A circuit according to claim 1, wherein the receiving means to which the second pipe is connected comprises the receiving means to which is already connected the main supply pipe, and wherein a non-return valve is positioned in the said second pipe in such a way as to permit the passage of fluid from the second source to the receiving means, whilst the branch pipe is connected to the second pipe between the second source and the non-return valve.

* * * * *